May 3, 1927.
H. D. HINELINE
VARIABLE SPEED SQUIRREL CAGE MOTOR
Filed June 16, 1922
1,627,330
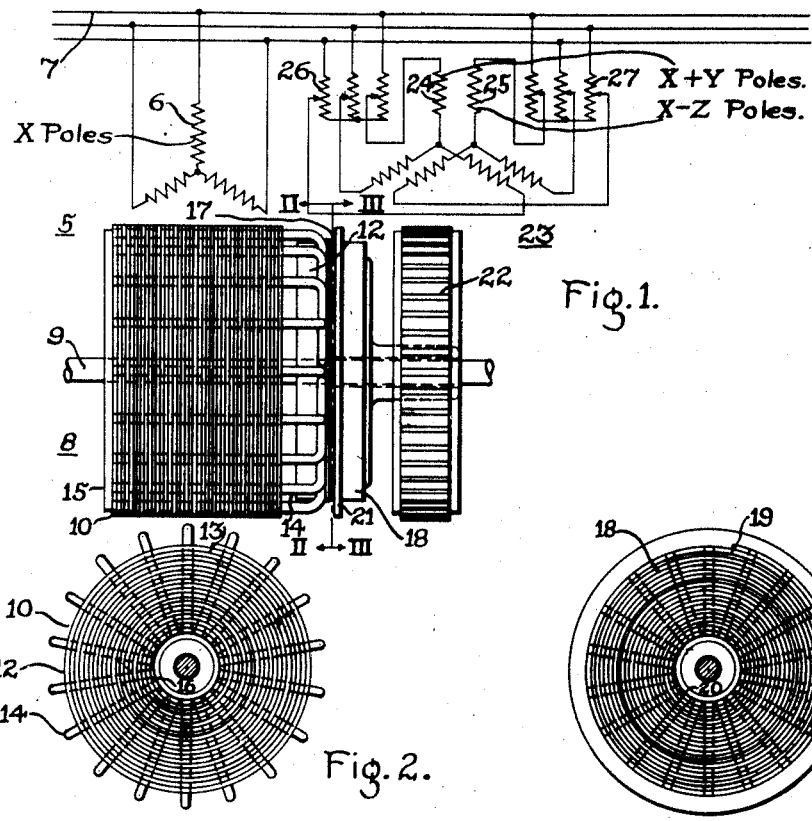
Fig. 1.
Fig. 2.
Fig. 3.
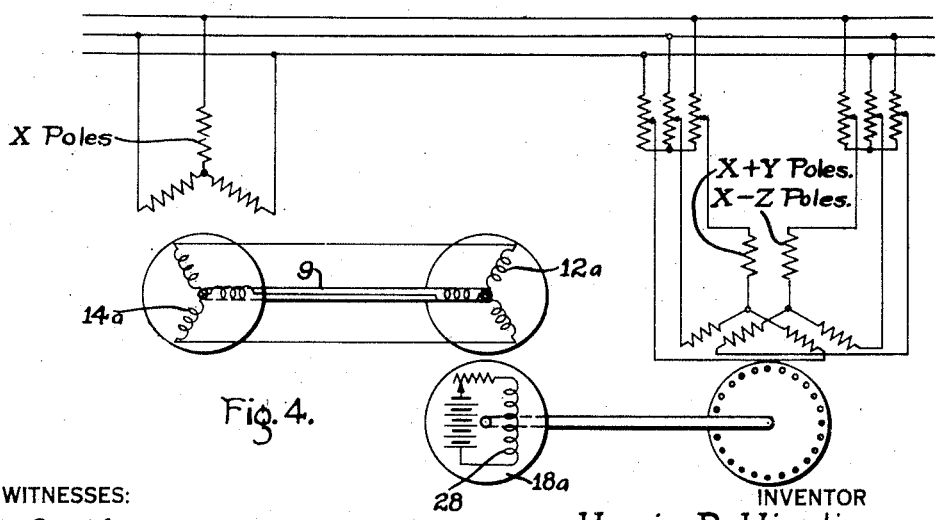
Fig. 4.
WITNESSES:
R. J. Butler
O. B. Buchanan
INVENTOR
Harris D. Hineline.
BY
Wesley G. Carr
ATTORNEY Patented May 3, 1927.

1,627,330

UNITED STATES PATENT OFFICE.

HARRIS D. HINELINE, OF AKRON, OHIO, ASSIGNOR TO WESTINGHOUSE ELECTRIC & MANUFACTURING COMPANY, A CORPORATION OF PENNSYLVANIA.

VARIABLE-SPEED SQUIRREL-CAGE MOTOR.

Application filed June 16, 1922. Serial No. 568,675.

My invention relates to induction motors and it has particular reference to a system for operating an induction-motor aggregate at variable speeds.

An object of my invention is to provide means electrically and mechanically associated with the secondary of a main induction motor for developing a controllable torque at a substantially constant speed.

A further object of my invention is to employ an auxiliary induction motor or induction generator in connection with said substantially constant-speed means for controlling the effective torque produced thereby.

A still further object of my invention is to provide a variable-speed induction-motor set comprising a main induction motor, an auxiliary induction machine having a primary member mechanically and electrically connected to the secondary member of said main induction motor, and a second auxiliary induction machine having its rotor member connected to the secondary member of said first-mentioned auxiliary induction machine and having a primary member which can be connected to the line either for a pole number larger than the main induction motor or for a pole number smaller than the same, whereby both over-and under-synchronous speeds of the main induction motor may be obtained.

A more specific object of my invention is to provide an induction motor with an auxiliary speed-controlling dynamo-electric machine having a radial air-gap, the primary member of said machine being carried by the rotor member of said induction motor.

With these and other objects in view, my invention consists in the structural apparatus and circuit arrangements described in the following specification and illustrated in the accompanying drawing, wherein, Fig. 1 is a side elevation of the rotor members of an induction-motor aggregate embodying my invention in a preferred form and representing the stator windings of the aggregate diagrammatically.

Figs. 2 and 3 are transverse sectional views taken upon the lines II—II and III—III of Fig. 1.

Fig. 4 is a diagrammatic view illustrating an equivalent electrical connection in a somewhat modified form, illustrating certain of the broader aspects of my invention.

In Fig. 1 is shown a main induction motor 5 having a primary stator winding 6 connected to a supply line 7. The rotor member 8 of the motor 1 is mounted upon a shaft 9 and comprises a main laminated core member 10 of usual design and an auxiliary core member 12 which is built up of spirally wound laminations 13, as indicated in Fig. 2. The main core member 10 is provided with slots or perforations for receiving the armature conductors 14 of a squirrel-cage winding, said conductors being connected, at the free end of the core 10, by means of a short-circuiting ring 15.

The other ends of the conductors 14 are extended beyond the main core member 10 and are bent to pass in a radial direction through slots or perforations provided in the outer face of the auxiliary core member 12, as indicated in Fig. 2, the inner ends of the radial extensions being connected by means of a short-circuiting ring 16. Cooperating with the auxiliary core member and spaced therefrom to provide a radial air gap 17, is a similar core member 18 which is rotatably mounted upon the shaft 9 and carries a radially disposed squirrel-cage winding comprising the conductors 19 and inner and outer short-circuiting rings 20 and 21.

Since the armature conductors 14 always carry currents of the slip frequency at any speed of the motor, the flux produced in the radial gap 17 will always be rotating at slip-frequency speed with respect to any point on the rotor 8 of the main machine 5, and hence said flux will be rotating at synchronous speed in space. The rotating core member 18, therefore, operates at a slip frequency which will depart but little from the synchronous speed.

Mechanically connected to the rotating core member 18 is the squirrel-cage rotor member 22 of a multiple pole-number induction machine 23 having a stator member provided with two primary windings 24 and 25 of different pole-numbers, one pole-number being greater than the pole-number of the main motor primary winding 6 and the other pole-number being less than the same. In the drawing the main motor primary winding is indicated as having X poles while the winding 24 has X+Y poles and the winding 25 X—Z poles. Either one or the other of the primary windings 24 and 25 may be connected to the lines through suitable energy-controlling devices, such as the adjustable autotransformers 26 and 27, respectively.

If the higher pole-number winding 24 is employed, the auxiliary machine 23 operates as an induction generator delivering power back into the line. The torque required to drive the auxiliary machine 23 is derived from the auxiliary rotor member 18 which reacts upon the squirrel-cage conductors 14 of the main motor to produce the effect of an added resistance therein. The torque or energy controlled by the auxiliary machine 23 may be varied by adjusting the auto transformer 26, since, for a given over-synchronous speed of the auxiliary machine 23, the power supplied to the line varies with the voltage impressed upon the primary windings of the machine.

In like manner, over-synchronous speeds of the main machine 5 may be obtained by employing the lower pole-number winding 25, whereby the auxiliary machine 23 operates as a motor driving the auxiliary rotor 18 at over-synchronous speed, thereby supplying electrical energy to the squirrel-cage conductors 14 of the main machine by an induction generator action.

Fig. 4 is a diagrammatic illustration of a modified arrangement which is an electrical equivalent of that shown in Fig. 1, and showing a synchronous-motor field member 28 on the auxiliary rotor 18ᵃ in lieu of the squirrel-cage construction 19 illustrated in Figs. 1 and 3.

In the embodiment shown in Fig. 4, the squirrel-cage winding 14 of Fig. 1 is replaced by a wound secondary member 14ᵃ which is connected to a similar wound secondary member 12ᵃ mounted on the shaft 9 of the main motor and cooperating with the synchronous-motor field member 28. The other apparatus of Fig. 4 is the same as that shown in Fig. 1, and the operation is identical except, with the rotor of the auxiliary machine 23, is always driven at exactly synchronous speed instead of being driven at an induction-motor speed which departs slightly from synchronism.

While I have described certain characteristics of my invention in detail, and while I have pointed out certain of the most obvious principles and purposes thereof, I do not intend that the language employed in the following claims shall be limited to the precise features described, but I intend that the claims shall be construed to cover all modifications which are fairly comprehended by the language thereof, when read in connection with the prior art, regardless of the details and functions mentioned in the description or illustrated in the drawing.

I claim as my invention:

1. A variable-speed induction-motor set comprising a main induction motor having primary and secondary windings, an auxiliary machine having the same pole-number as said main motor, said auxiliary machine being electrically connected to said secondary windings and mechanically connected to said main motor, and an induction machine electrically connected to the supply line and mechanically connected to said auxiliary machine, said induction machine having a synchronous speed different from that of said auxiliary machine, said auxiliary machine having a member rotating at a substantially constant speed relative to the stator of said induction machine.

2. A variable-speed induction-motor set comprising a main induction motor having primary and secondary windings, an auxiliary induction machine having the same pole-number as said main motor, said auxiliary machine being electrically connected to said secondary windings and mechanically connected to said main motor, a third induction machine electrically connected to the supply line and mechanically connected to said auxiliary machine, said third induction machine having a synchronous speed different from that of said auxiliary machine, said auxiliary induction machine having a substantially constant synchronous speed relative to the stator of said third induction machine, and means for controlling the slip of said third induction machine.

3. A variable-speed induction-motor set comprising a main induction motor having primary and secondary windings, means associated with said secondary windings for developing a synchronously rotating flux, a rotor member operatively associated with said flux for developing torque therewith and an induction machine electrically connected to the supply line and mechanically connected to said rotor member, said induction machine having a synchronous speed different from that of said rotor member.

4. A variable-speed induction-motor set comprising a main induction motor having primary and secondary windings, means associated with said secondary windings for developing a synchronously rotating flux, a rotor member operatively associated with said flux for developing torque therewith, an induction machine electrically connected to the supply line and mechanically connected to said rotor member, said induction machine having a synchronous speed different from that of said rotor member, and means for controlling the slip of said induction machine.

5. A variable-speed induction-motor set comprising a main induction motor having primary and secondary windings, an auxiliary machine electrically connected to said secondary windings and having a member rotating at substantially constant absolute speed, an induction machine having two pole-numbers corresponding to synchronous speeds respectively higher and lower than that of said auxiliary machine, means for connecting said induction machine to the line for either one or the other of said pole-numbers and means for mechanically coupling said induction machine and said auxiliary machine, said relative synchronous speeds being expressed in terms of a one-to-one mechanical coupling.

6. A variable-speed induction-motor set comprising a main induction motor having primary and secondary windings, an auxiliary machine having the same pole-number as said main motor, said auxiliary machine being electrically connected to said secondary windings and mechanically connected to said main motor, an induction machine having two pole-numbers corresponding to synchronous speeds respectively higher and lower than that of said auxiliary machine, means for connecting said induction machine to the line or either one or the other of said pole-numbers and means for mechanically coupling said induction machine and said auxiliary machine, said relative synchronous speeds being expressed in terms of a one-to-one mechanical coupling.

7. A variable-speed induction-motor set comprising a main induction motor having primary and secondary windings, an auxiliary machine having the same pole-number as said main motor, said auxiliary machine being electrically connected to said secondary windings and mechanically connected to said main motor, an induction machine having two pole-numbers corresponding to synchronous speeds respectively higher and lower than that of said auxiliary machine, means for connecting said induction machine to the line for either one or the other of said pole-numbers, means for mechanically coupling said induction machine and said auxiliary machine, said relative synchronous speeds being expressed in terms of a one-to-one mechanical coupling, said auxiliary machine having a substantially constant speed relative to the stator of said induction machine, and means for controlling the torque of said induction machine.

8. A variable-speed induction-motor set comprising a main induction motor having primary and secondary windings, means associated with said secondary windings for developing a synchronously rotating flux, a rotor member operatively associated with said flux for developing torque therewith, an induction machine having two pole-numbers corresponding to synchronous speeds respectively higher and lower than that of said rotor member, means for connecting said induction machine to the line for either one or the other of said pole-numbers and means for mechanically coupling said induction machine and said rotor member, said relative synchronous speeds being reduced, for the sake of comparison, to the speeds obtaining with a one-to-one mechanical coupling.

9. A variable-speed induction-motor set comprising a main induction motor having primary and secondary windings, means associated with said secondary windings for developing a synchronously rotating flux, a rotor member operatively associated with said flux for developing torque therewith, an induction machine having two pole-numbers corresponding to synchronous speeds respectively higher and lower than that of said rotor member, means for connecting said induction machine to the line for either one or the other of said pole-numbers, means for mechanically coupling said induction machine and said rotor member, said relative synchronous speeds being reduced, for the sake of comparison, to the speeds obtaining with a one-to-one mechanical coupling, and means for controlling the torque of said induction machine.

10. A variable-speed induction-motor set comprising a main induction motor having primary and secondary windings, means associated with said secondary windings for developing a synchronously rotating flux, a secondary member of the induction-motor type operatively associated with said means, and variable-speed means for controlling the slip of said secondary member.

11. A variable-speed induction-motor set comprising a main induction motor having primary and secondary windings, means associated with said secondary windings for developing a synchronously rotating flux, a secondary member of the induction-motor type operatively associated with said means, and means for causing said secondary member to develop a variable torque either as a motor or as a generator.

12. A variable-speed induction-motor set comprising a main induction motor having primary and secondary windings, means associated with said secondary windings for developing a synchronously rotating flux, a secondary member of the induction-motor type operatively associated with said means, and an auxiliary induction machine electrically connected to the supply-line and mechanically coupled to said secondary member, said auxiliary induction machine having a synchronous speed different from that of said coupled secondary member.

13. A variable-speed induction-motor set comprising a main induction motor having primary and secondary windings, means associated with said secondary windings for developing a synchronously rotating flux, a secondary member of the induction-motor type operatively associated with said means, and an auxiliary induction machine electrically connected to the supply-line and mechanically coupled to said secondary member, said auxiliary induction machine having two pole-numbers corresponding to synchronous speeds respectively higher and lower than that of said coupled secondary member.

14. A variable-speed induction-motor set comprising a main induction motor having primary and secondary windings, means associated with said secondary windings for developing a synchronously rotating flux, a secondary member of the induction-motor type operatively associated with said means, an auxiliary induction machine electrically connected to the supply-line and mechanically coupled to said secondary member, said auxiliary induction machine having a synchronous speed different from that of said coupled secondary member, and means for controlling the energy in said secondary member.

15. A variable-speed induction-motor set comprising a main induction motor having primary and secondary windings, means associated with said secondary windings for developing a synchronously rotating flux, a secondary member of the induction-motor type operatively associated with said means, an auxiliary induction machine electrically connected to the supply-line and mechanically coupled to said secondary member, said auxiliary induction machine having two pole-numbers corresponding to synchronous speeds respectively higher and lower than that of said coupled secondary member, and means for controlling the energy in said secondary member.

16. A variable-speed induction-motor set comprising a main induction motor having primary and secondary windings, means associated with said secondary windings for developing a synchronously rotating flux, a secondary member of the induction-motor type operatively associated with said means, an auxiliary induction machine electrically connected to the supply-line and mechanically coupled to said secondary member, said auxiliary induction machine having a synchronous speed different from that of said coupled secondary member, and variable-voltage transformer means interposed in the auxiliary apparatus between the secondary winding of the main motor and said line.

17. A variable-speed induction-motor set comprising a main induction motor having primary and secondary windings, means associated with said secondary windings for developing a synchronously rotating flux, a secondary member of the induction-motor type operatively associated with said means, an auxiliary induction machine electrically connected to the supply-line and mechanically coupled to said secondary member, said auxiliary induction machine having two pole-numbers corresponding to synchronous speeds respectively higher and lower than that of said coupled secondary member, and variable-voltage transformer means interposed in the auxiliary apparatus between the secondary winding of the main motor and said line.

18. A variable-speed induction-motor aggregate comprising a main induction motor having a stator and a rotor, primary windings on said stator, said rotor comprising a main core portion co-operating with said stator and an auxiliary core portion, a squirrel-cage secondary member comprising armature conductors and an end ring mounted on said main core portion, the free ends of said conductors being extended and disposed radially across the outer face of said auxiliary core portion, end rings connecting the inner ends of said extended conductors, and a spaced rotor member operatively associated with said auxiliary core portion for developing torque therewith.

19. A variable-speed induction-motor aggregate comprising a main induction motor having a stator and a rotor, primary windings on said stator, said rotor comprising a main core portion co-operating with said stator and an auxiliary core portion, a squirrel-cage secondary member comprising armature conductors and an end ring mounted on said main core portion, the free ends of said conductors being extended and disposed radially across the outer face of said auxiliary core portion, end rings connecting the inner ends of said extended conductors, a spaced rotor member operatively associated with said auxiliary core portion for developing torque therewith, and means for controlling said torque.

20. A variable-speed induction-motor aggregate comprising a main induction motor having a stator and a rotor, primary windings on said stator, said rotor comprising a main core portion co-operating with said stator and an auxiliary core portion, a squirrel-cage secondary member comprising armature conductors and an end ring mounted on said main core portion, the free ends of said conductors being extended and disposed radially across the outer face of said auxiliary core portion, end rings connecting the inner ends of said extended conductors, and a spaced rotor member operatively associated with said auxiliary core portion for developing torque therewith, said auxiliary core portion being built up of circumferentially disposed laminations.

21. A variable-speed induction-motor aggregate comprising a main induction motor having a stator and a rotor, primary windings on said stator, said rotor comprising a main core portion co-operating with said stator and an auxiliary core portion, a squirrel-cage secondary member comprising armature conductors and an end ring mounted on said main core portion, the free ends of said conductors being extended and disposed radially across the outer face of said auxiliary core portion, end rings connecting the inner ends of said extended conductors, a spaced rotor member operatively associated with said auxiliary core portion for developing torque therewith, and means for controlling said torque, said auxiliary core portion being built up of circumferentially disposed laminations.

22. A variable-speed induction-motor aggregate comprising a main induction motor having a stator and a rotor, primary windings on said stator, said rotor comprising a main core portion co-operating with said stator and an auxiliary core portion, a squirrel-cage secondary member comprising armature conductors and an end ring mounted on said main core portion, the free ends of said conductors being extended and disposed radially across the outer face of said auxiliary core portion, end rings connecting the inner ends of said extended conductors, and a spaced rotor member operatively associated with said auxiliary core portion for developing torque therewith, said auxiliary core portion being built up of helically-wound laminations.

23. A variable-speed induction-motor aggregate comprising a main induction motor having a stator and a rotor, primary windings on said stator, said rotor comprising a main core portion cooperating with said stator and an auxiliary core portion, a squirrel-cage secondary member comprising armature conductors and an end ring mounted on said main core portion, the free ends of said conductors being extended and disposed radially across the outer face of said auxiliary core portion, end rings connecting the inner ends of said extended conductors, a spaced rotor member operatively associated with said auxiliary core portion for developing torque therewith, and means for controlling said torque, said auxiliary core portion being built up of helically wound laminations.

24. A variable-speed induction-motor aggregate comprising a main induction motor having a stator and a rotor, and an auxiliary speed-controlling dynamo-electric machine having a radial air-gap, one member of said machine being carried by said rotor and being electrically directly connected to the same.

25. A variable-speed induction-motor aggregate comprising a main induction motor having a stator and a rotor, an auxiliary speed-controlling dynamo-electric machine having a radial air-gap, one member of said machine being carried by said rotor and being electrically directly connected to the same, and torque-controlling means for said auxiliary dynamo-electric machine.

In testimony whereof, I have hereunto subscribed my name this 7th day of June 1922.

HARRIS D. HINELINE.